United States Patent
Halavy

(10) Patent No.: US 8,502,857 B2
(45) Date of Patent: Aug. 6, 2013

(54) SYSTEM AND METHOD FOR COMBINING A PLURALITY OF VIDEO STREAM GENERATED IN A VIDEOCONFERENCE

(75) Inventor: Avishay Halavy, Tel Aviv (IL)

(73) Assignee: Polycom, Inc., San Jose, CA (US)

( * ) Notice: Subject to any disclaimer, the term of this patent is extended or adjusted under 35 U.S.C. 154(b) by 887 days.

(21) Appl. No.: 12/581,626

(22) Filed: Oct. 19, 2009

(65) Prior Publication Data
US 2010/0128105 A1     May 27, 2010

Related U.S. Application Data

(60) Provisional application No. 61/116,948, filed on Nov. 21, 2008.

(51) Int. Cl.
*H04N 7/15* (2006.01)

(52) U.S. Cl.
USPC ..................... 348/14.03; 348/14.09

(58) Field of Classification Search
USPC .......... 348/14.08, 14.09, 14.03, 14.05, 14.07, 348/14.01, 36, 39
See application file for complete search history.

(56) References Cited

U.S. PATENT DOCUMENTS

| | | | |
|---|---|---|---|
| 7,298,392 B2 | 11/2007 | Cutler | |
| 2005/0122392 A1* | 6/2005 | Johansen et al. | 348/14.09 |
| 2006/0125921 A1* | 6/2006 | Foote | 348/159 |
| 2008/0002962 A1* | 1/2008 | Ito et al. | 396/287 |
| 2008/0158341 A1* | 7/2008 | Gelsomini et al. | 348/36 |

* cited by examiner

*Primary Examiner* — Stella Woo
(74) *Attorney, Agent, or Firm* — Wong, Cabello, Lutsch, Rutherford & Brucculeri L.L.P.

(57) ABSTRACT

Disclosed herein is a method and apparatus for videoconferencing that allows video images from two or more cameras at the same site to be displayed as a single panoramic image. Accordingly, a conferencing endpoint having a single monitor can display the panoramic image of the two or more video images from an endpoint having multiple cameras, such as a telepresence endpoint. A sliding display area can be used to manually define a zoomed portion of the panoramic image to be displayed. Alternatively, the zoomed portion may be determined automatically. The zoomed portion may be changed during the course of the conference.

42 Claims, 6 Drawing Sheets

SYSTEM AND METHOD FOR COMBINING A PLURALITY OF VIDEO STREAM GENERATED IN A VIDEOCONFERENCE

CROSS-REFERENCE TO RELATED APPLICATIONS

This application claims the benefit of the filing date of United States Provisional Application No. 61/116,948, filed on Nov. 21, 2008, the entire contents of which are incorporated herein by reference.

FIELD OF THE INVENTION

The subject matter of the present disclosure relates to the field of videoconferencing and more specifically to combining a plurality of video streams coming from a plurality of video cameras shooting at the same site.

BACKGROUND

Multimedia conferencing is becoming more and more popular in day to day operation of corporations. An organization can have a plurality of conferencing terminals and/or virtual meeting rooms. Some of the virtual meeting rooms include telepresence videoconferencing systems (TPVS). An exemplary TPVS can include a large conferencing table with a line of chairs along one side of the table. A video zone is located on the other side of the table, in front of the line of chairs. The video zone can include two or more video displays, adjacent to each other and two or more video cameras. In some exemplary TPVSs, the video zone, i.e., the displays and cameras, is adjusted to a certain arrangement of the table and the line of chairs. The video camera setup is adjusted to capture the conferees sitting along the other side of the table. The two or more video images are delivered to the other end or ends of the communication session, to be displayed over a video zone in the other end TPVS. The TPVS gives the impression that the conferees, located at the other side of the communication line and using another TPVS, are sitting in the same room around the conferencing table.

A regular videoconferencing endpoint is a terminal on a network, capable of providing real-time, two-way audio/visual/data communication with other terminals or a multipoint control unit (MCU). An MCU is a conference controlling entity that is typically located in a node of a network or in a terminal which receives several channels from endpoints. According to certain criteria, the MCU processes audio and visual signals and distributes them to a set of connected channels. Examples of MCUs include the MGC-100, RMX 2000, which are available from Polycom, Inc. MCUs can be composed of two logical units: a media controller (MC) and a media processor (MP). A more thorough definition of an endpoint (terminal) and an MCU can be found in the International Telecommunication Union ("ITU") standards, such as but not limited to the H.320, H.324, and H.323 standards. Additional information regarding the ITU standards can be found at the ITU website. A terminal (which may be referred to as an endpoint) may provide speech and video; or speech, video and data communications, etc. Exemplary videoconferencing endpoints include Polycom VSX 7000, HDX 9004, by Polycom, Inc. Unlike a TPVS, a regular videoconferencing endpoint generally provides a single video stream and is associated with a single camera. In the disclosure the terms image and video image may be used interchangeably.

Some video conferencing sessions involve some conferees using a TPVS while the other conferees are using a regular endpoint having one display. In a session wherein a TPVS is located in one end and a regular endpoint on the other end, only one camera out of the plurality of cameras located in the video zone of the TPVS is active and only its stream is transmitted, processed and displayed over the display of the regular video conferencing endpoint. This decreases the capabilities of the TPVS each time a regular endpoint joins the conference call.

The video stream from each of the video cameras of a TPVS may be processed as a video stream of a videoconferencing endpoint. Each video stream is compressed according to compression standards used in video conferencing such as H.264, H.263, etc. Exemplary TPVSs include Polycom RPX or Polycom TPX by Polycom, Inc.

If an MCU is involved, the plurality of compressed video streams from a TPVS can be processed as separate video streams. Each stream can be handled as if it was received from an independent endpoint. Therefore, each stream can be displayed in a separate slot (window) in a layout of the other endpoint. Occasionally, the plurality of images may include overlay areas and/or portion of conferee's image.

There is a need in the art for a method and a system that improves the experience of the conferees that are using regular video conferencing endpoint while participating in a video conferencing session in which one or more of the other participants are using TPVS. Furthermore, such a system will prevent the unavoidable degeneration of the TPVS capabilities when at least one of the other endpoint is a regular endpoint.

SUMMARY

The above-described needs are met by receiving and processing video streams from two or more video cameras of a TPVS and stitching in real time the two or more processed video streams into a single stitched stream of video image data. As used herein, the term "real time" means that the stitching process is executed on the received video streams before transmitting the resulting video towards the endpoints in the other end of the session. The stitched stream reconstructs the image of the shot area as if it was shot by a single camera. The processing of the received two or more video streams can include identifying and removing overlay areas in at least one of the images. Overlay (repeated) areas can be defined as areas that were captured by two or more cameras. In some cases scaling may be needed for aligning the different images into a similar size. In some cases scaling and cropping of the combined image may be needed to fit into its associated window in a layout of the conference or to comply with the size of the display of a regular endpoint.

A sliding displayed area can be used to present a portion of the stitched image over the display of a regular endpoint, wherein the conferee can define the size (zoom up or down) of the sliding displayed area and can move the sliding displayed area over the stitched image. According to some embodiments, the size and the placement of the sliding displayed area can be changed during the videoconferencing. Controlling the size of the sliding displayed area and its movement over the stitched area can be done by using a remote control of the endpoint and a click and view function, for example. An exemplary click and view function is disclosed in U.S. patent application Ser. No. 10/346,306 (published as 2003/0,174,202), the entire contents of which are incorporated herein by reference. Another exemplary embodiment may use the sliding displayed area function for concentrating computing resources and bandwidth to a particular section of the stitched image.

An exemplary embodiment may operate in two stages, an adjustment stage and an ongoing stage. During the adjustment stage, the overlay areas are found and a scaling factor between images can be defined. An exemplary adjustment stage may use an automatic process for identifying the borders of the overlay areas as well as the differences in scaling between two adjacent images. Other embodiments may use manual methods in which a user can mark the overlay areas as well as repeated similar image elements in both images that can be used for calculating differences in scaling between the images. Alternate embodiments may use both the automatic and the manual methods. At the end of the adjustment stage, a stitching instruction file can be created. An exemplary stitching instruction file can define cropping coordinates, scaling factor for each image and the relative placement of the images received from the TPVS. Alternatively and additionally, the stitching instruction file can include coordinates of two similar repeated points per each two adjacent images.

In some embodiments, the adjustment stage can be executed in the site of the TPVS after installation, for example. The adjustment stage results in a stitching instruction file that can be stored in a configuration file of the TPVS. During the establishment of the videoconferencing session, the stored stitching instruction file can be transferred to a video control unit (VCU) that conducts the videoconferencing session and stitches the plurality of video streams received from a TPVS. An exemplary VCU can be a multipoint control unit (MCU). In some embodiments of the present invention the VCU can be embedded within the TPVS. In other embodiments the VCU can be embedded within the videoconferencing endpoint in the other end of the session.

An exemplary adjustment stage can use a still (snapshot) image, a single frame from all the cameras, for example. An exemplary still image can be in a low resolution to accelerate the calculations. An exemplary automatic process can scan a configurable portion of an image close to a border with another image, looking for two or more similar areas that exist in both images, and similar repeated areas. The scanned area can be adaptable and can be increased or decreased according to the results. Another exemplary embodiment may use alignment indicators, which can be embedded within the decoration of the TPVS over the conferencing table or over the wall behind the chairs, for example. Other embodiments may use a projector that can project the alignment indicators during the adjustment stage, etc.

In an exemplary manual adjustment process, a user can be prompted to select two similar repeated image elements within the overlay area in each image. Those two points are used for identifying the overlay area and calculating a scaling parameter for the images. In an embodiment in which the VCU is embedded within an MCU, the user can be a conferee on the other side of the connection, i.e., at a regular videoconferencing endpoint. Such a user can communicate with the VCU using a click and view function to select the two points. The conferee may use a remote control device of its videoconferencing endpoint to mark the selected points.

Another embodiment of an adjustment process may display a cursor and the coordinate of the cursor. The coordinate can be measured from the top left point of the image and can be expressed in units, wherein the units can be pixels, macroblocks, etc. A user can control the positioning of the cursor by using the remote control unit of the endpoint, for example. The user can select the two similar repeated points and feed the coordinates to the requesting adjustment process.

In yet another embodiment, the adjustment stage is executed during the installation. Each camera is adjusted to shoot with a same scaling as the other cameras. Furthermore, the cameras are aligned to shoot adjacent areas of the site but without overlay areas. The areas to be captured by the cameras are adjacent but exclusive from each other so that the cameras cover the entire line of chairs without repetitions. During the ongoing stage, the two or more exclusive video streams covering the line of chairs without overlay areas can be combined into a single video image that can be cropped and/or scaled into the shape and size of its allocated window in the layout of the conference and can be transferred toward the far endpoint.

In an exemplary embodiment that includes a sliding displayed area functionality, only a portion of the combined image (the sliding displayed area portion) can be displayed in the layout of the conference. The displayed area can slide over the stitched image and can present different portions of the stitched image. The sliding displayed area can reside over a certain portion of the image and can be moved to another section of the stitched image. Moving the sliding displayed area can be done automatically according to the location of the current speaker, for example. In other embodiments, the sliding displayed area can be moved by the conferee of the regular videoconferencing endpoint by using his remote control, for example.

In an exemplary embodiment in which a TPVS delivers for each video stream the associated audio stream, the location of the sliding displayed area can be determined by the difference in the energy of the audio streams, for example. Yet, in another embodiment, the TPVS can be capable of determining the location of the speaker in the room using an array of microphones, for example. The location of the speaker can be delivered to the VCU to be used for controlling the location of the sliding displayed area to include the speaker image, for example.

Another exemplary embodiment can be used in a multipoint conference between three or more TPVS rooms. In such a multipoint conference, two or more video images received from each TPVS can be stitched into an image to be displayed on one of the display units of the other TPVS. Consequently, a continuous presence layout consisting of two or more stitched images can be created to be displayed in participating TPVS rooms. The conferees sitting in one of the TPVS rooms will be able to see the other two or more TPVS rooms simultaneously.

The term video stream refers to open video (decoded video). In some embodiments in which the VCU is embedded within the TPVS, the video stream can be the video received from the video cameras of the TPVS. In other embodiments wherein the VCU is embedded within an MCU, the video streams are the two or more encoded video streams received from the TPVS, which are decoded into two or more (open) video streams. In the disclosure the terms view and layout may be used interchangeably.

BRIEF DESCRIPTION OF THE DRAWINGS

Exemplary embodiments of the disclosure will be understood and appreciated more fully from the following detailed description, taken in conjunction with the drawings, in which.

DETAILED DESCRIPTION

Turning now to the figures in which like numerals represent like elements throughout the several views, exemplary embodiments, aspects and features of the disclosed methods, systems, and apparatuses are described. For convenience, only some elements of the same group may be labeled with numerals. The purpose of the drawings is to describe exemplary embodiments and not for limitation or for production. Therefore features shown in the figures are chosen for convenience and clarity of presentation only.

Figure 1:
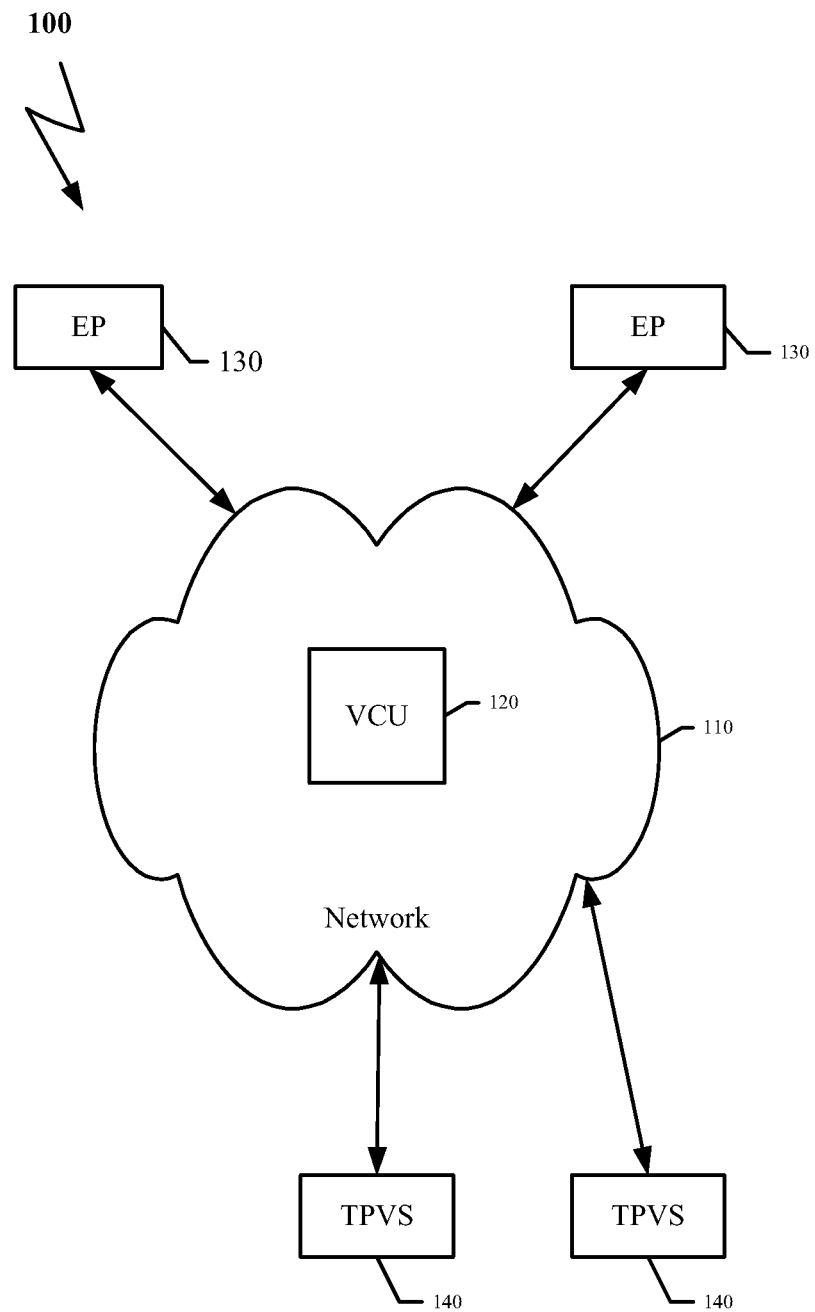
FIG. 1 illustrates multimedia conferencing network having a variety of electronic videoconferencing systems.

FIG. 1 is a block diagram illustrating an exemplary multimedia multipoint conferencing system 100. System 100 can include a network 110, one or more video control units (VCU) 120, a plurality of endpoints 130 and one or more TPVSs 140. Network 110 can be, but is not limited to, a packet switched network, a circuit switched network, or any combination of the two. The multimedia communication over the network can be based on communication protocol such as but not limited to H.320, H.324, H.323, SIP, etc. and may use compression standards such as but not limited to H.263, H.264, etc.

VCU 120, TPVS 140 and endpoints 130 can be adapted to operate according to the disclosed embodiments to improve a user's perception\experience while viewing two or more images from a TPVS while using a regular endpoint. Some disclosed embodiments relate to a centralized architecture in which VCU 120 is adapted to perform real time stitching and sliding methods. Alternatively, distributed architectures can be used wherein TPVS 140 as well as VCU 120 are adapted to share performing the disclosed stitching and sliding methods. The following discussion describes an exemplary VCU embedded within an MCU. More information about the operation of VCU 120, TPVS 140 and endpoints 130 are disclosed below in conjunction with FIG. 2-FIG. 6.

Figure 2:
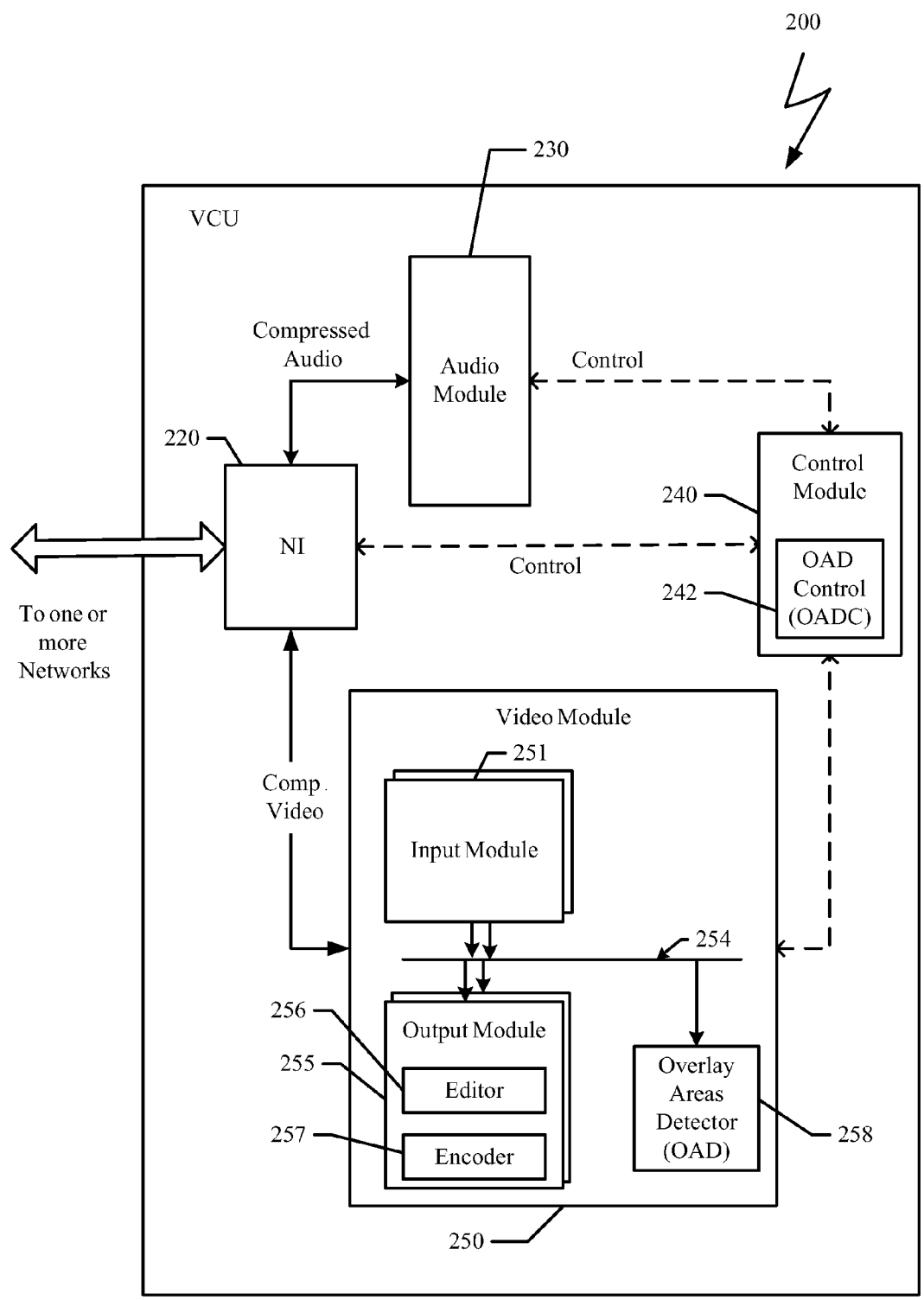
FIG. 2 is a simplified block diagram with elements of an exemplary video control unit (VCU) that implements exemplary techniques that are disclosed in the below description.

FIG. 2 illustrates elements of an exemplary VCU 200, which is capable of implementing aspects of the disclosure. VCU 200 may include a network interface module 220, an audio module 230, a control module 240 and a video module 250. The video module 250 can include a plurality of input modules 251, a plurality of output modules 255, a video common interface 254 and an overlay area detector (OAD) 258. Each output module can comprise an editor 256 and an encoder 257. The common interface 254 may include any of a variety of interfaces, such as shared memory, ATM bus, TDM bus, switching and direct connection.

The network interface module 220 communicates with a plurality of endpoints 130 (FIG. 1) and TPVS 140 via network 110 (FIG. 1). Network interface 220 processes the communication according to one or more variety of communication standards such as but not limited to H.320, H.323, SIP, etc. and compression standards such as H.261, H.263, H.264, etc. Network interface 220 can receive and transmit control and data information to/from other MCUs and endpoints. More information concerning the communication between the endpoint and the MCU over network 110 and information describing signaling, control, compression, and establishing of a video call can be found in the international telecommunication union (ITU) standards H.320, H.321, H.323, H.261, H.263 and H.264, incorporated herein by reference.

Network interface module 220 multiplexes/demultiplexes the different signals communicated between the endpoints 130 and TPVS 140 (FIG. 1) and the VCU 200. The compressed audio signal is transferred to and from the audio module 230. The compressed video signal is transferred to and from video module 250 and the control and signaling is transferred to and from control module 240. Furthermore, in an exemplary embodiment in which distributed architecture is used, network interface module 220 can be capable of handling a stitching instruction file that is transferred between the TPVS 140 and the control module 240. The stitching instruction file may include information such as the borders of overlay areas and scale factors if exist.

Audio module 230 may receive compressed audio streams from the endpoints 130 and TPVS 140 (FIG. 1) via network interface 220. The audio module 230 decodes the compressed audio streams, analyzes the decoded streams, selects certain streams and mixes the selected streams. Then the mixed stream is compressed and the compressed audio stream is sent via the audio line back to network interface 220, which sends the compressed audio streams to the different endpoints 130 and TPVS 140. Audio streams that are sent to different endpoints and TPVSs can differ from each other. For example the audio stream can be formatted according to the different communication standard and according to the needs of the individual endpoint. Also, audio streams may not include the voice of the particular user associated with the endpoint or TPVS to which the audio stream is sent even though that voice is included in all other audio streams.

Audio module 230 can be adapted to analyze the received audio signals from the endpoints and determine the audio signal energy of each endpoint. Information on the signal energy can be transferred to the control module 240. The energy level can be used to determine which endpoint is a "selected endpoint" or a "presented endpoint," i.e., which endpoint is the speaking endpoint at a given time. In some embodiments in which an automatic sliding display area is used, the sliding zone can be automatically moved along the stitched image of a TPVS to include the image of the speaker. The speaker's position can be calculated by analyzing the audio energy of two or more audio streams received from the TPVS. In such embodiments the audio module 230 can provide the control module 240 with an estimated location of the speaker. In some embodiments the location can be expressed by coordinates. In other embodiments the audio module 230 can point to one of the streams from the TPVS as the stream that includes the image of the speaker.

Yet in another exemplary embodiment, overlay area detector control (OADC) 242 can receive two or more energy indications of the audio received from the TPVS. Each energy indication can be associated with a received video image from the TPVS. OADC 242 can be adapted to consider the audio energy (AE) of the two or more streams and to centralize the sliding displayed area over a weighted center of the audio streams. The following table is an exemplary decision table used by OADC 242 when there are three video/audio streams A, B, and C:

| AE of A | AE of B | AE of C | The center of the sliding displayed area |
| --- | --- | --- | --- |
| 4 | 3 | 2 | Over image A |
| 3 | 4 | 2 | Over image B |
| 3 | 4 | 4 | In between B&C |

Another task of the audio module 230 can be implemented in an embodiment in which click and view option is used. In such an embodiment the DTMF signals can be used to carry conferees selections. Audio module 230 can be capable of decoding the DTMF signals, which are embedded within the audio signal of the conferee. The user's selection can be transferred over the control connection to the control module 240.

Control module 240 can be a logical unit that controls the operation of the VCU 200. In addition to common operation of a typical MCU, VCU 200 is capable of additional functionality as a result of having control module 240. Control module 240 can include an OAD control module (OADC) 242. OADC 242 can be adapted to control the two stages of a stitching process: the adjustment stage and the ongoing stage. During an exemplary automatic adjustment stage, OADC 242 can instruct the OAD 258 to get a single frame from each stream (image) that is sent from the TPVS. In response, OAD 258 can generate a stitching instruction file and deliver it to OADC 242. In the case that the adjustment stage is a manual process, OADC 242 can prompt the user to identify a pair of similar repeated image elements in the overlay area within each image. The two pairs are used for calculating a scale factor. The two similar pairs and the edges of each image can be used for defining the overlay area. Prompting the conferee can be implemented by using an IVR or a click and view function.

The OADC 242 can be capable of receiving a stitching instruction file from the OAD 258. In an alternate embodiment, the stitching instruction file can be received from the TPVS during establishment of the call. The stitching instruction file can be received via NI 220 over the control connection, for example. The stitching instruction file can reflect the overlay area in each image that is received from each TPVS, which is involved in a session with a regular endpoint, and a scaling factor if needed.

For each TPVS the OADC 242 is capable of converting the stitching instruction file into editing instructions to be used by editors 256, for example. According to the window in the conference layout allocated for the stitched video image of the TPVS, OADC 242 can calculate the cropping area and the scaling factor per each image of the plurality of images of the TPVS as well as the location of the cropped area to be displayed in the window allocated to the TPVS.

The editing instructions can be transferred to the editor 256. In an embodiment in which a sliding displayed area functionality is used, OADC 242 can be capable of creating a virtual rectangle that is proportional to the window allocated to the stitched image of the TPVS. OADC 242 can instruct the video module 250 to display a portion of the stitched image according to the size and the location of the center of the sliding rectangle over the stitched image. By using a function similar to click and view, OADC 242 can prompt the conferee to move the center of the sliding rectangle over the stitched image. A cursor can be displayed for pointing the center. Zoom up and zoom down buttons can be displayed for controlling the size of the sliding displayed area. When an "Enter" command is received from the conferee, instructions are given to the editor 256 to crop the virtual rectangle area from the stitched image, enlarge it to the size of the allocated window and display the enlarged image of the sliding displayed area in the TPVS window. In an automatic sliding mode, the center of the sliding rectangle can be received from the audio module 230, for example.

The location of the new sliding displayed area is translated to pixels in each decoded image that is received from the TPVS taking into account the scaling factor and the coordinates of the overlay areas. The new editing instructions are transferred to the relevant editor 256. More information on the operation of OADC 242 is disclosed below in conjunction with FIG. 4 and FIG. 5.

Video module 250 receives compressed video streams from the plurality of endpoints 130 (FIG. 1) and two or more compressed video streams from each TPVS 140 (FIG. 1) that participate in videoconferencing sessions. The compressed video streams are sent toward the VCU 200 via network 110 (FIG. 1) and processed by network interface 220. Video module 250 can create one or more compressed continues presence (CP) video images according to one or more layouts that are associated with one or more conferences currently being conducted by the VCU 200. Each input module 251 can be associated with a compressed video stream of one regular endpoint 130 or with one of the plurality of compressed video stream that are sent from a TPVS 140. Each output module 255 can be associated with a compressed video stream that is sent to a display unit of regular endpoint or with one of the plurality of compressed video stream that are sent toward a TPVS 140 to be displayed over one of its video display units.

Exemplary input module 251 performs common operations of an input module of an MCU. Input module 251 receives compressed video sent from an endpoint 130 (FIG. 1) associated with the relevant input module 251 or one of the compressed streams from a TPVS 140 (FIG. 1). The compressed video can be decoded into decoded video data. Usually the decoded video data is constructed from a matrix of values per the video pixels. The values per pixel can comprise three components, referred to as YUV. The Y component reflects the brightness and the U and V components reflect the chrominance of the pixel. During the ongoing phase, the decoded information can be stored in a buffer and be transferred via the video common interface 254 to one or more output modules 255. During an automatic adjustment stage the plurality of the decoded video streams associated with a TPVS 140 are transferred via the video common interface 254 to OAD 258.

Referring now to the components of output module 255, editor 256 is capable of getting decoded data of relevant video images from the video common interface 254 to be composed into a continuous presence (CP) image created by the output module 255. The editor 256 may scale and place the video data of each selected conferee into an editor frame memory according to the location of the image in the layout associated with the composed video of the CP image. In some embodiments the editor can add text, icon(s), borders, etc. over the CP image. When the editor frame memory is ready with the data from selected conferee's images, the data in the frame memory is then encoded by encoder 257.

In addition to the common operation of output module 255, as depicted above, if one of the selected endpoints is a TPVS 140 (FIG. 1), having two or more video streams, editor 256 can be adapted to get editing instructions from OADC 242. Editor 256 processes the editing instructions and accordingly can crop overlay areas from relevant images of TPVS and scale the remaining area for smoothly stitching the plurality of TPVS images into one stitched panoramic image in real time. The processed video data is stored in the editor frame memory in address zones associated with the slot that is allocated to the TPVS image. Then the video of the frame memory is encoded by encoder 257 and transferred to one or more regular endpoints that are associated to the output module 255 via network interface 220.

In the case of a multipoint conference between three or more TPVS rooms, an editor 256 associated with one of the display units of a TPVS room may get stitching instructions related to two or more video streams received from another TPVS. Then, the editor can stitch the two or more video images received from the other TPVS into a stitched image (i.e., a panoramic image) to be displayed on its associated display unit in order to create Continuous Presence effect.

In embodiments in which a click and view function is used, editor 256 can be capable of creating and displaying menus and a cursor as needed. In embodiments having the sliding displayed area functionality, editor 256 can be capable of adapting the cropping areas and the scaling factor of each image sent from the TPVS according to the stitching editing instruction for keeping a smooth stitched image and the new location of the center of the sliding displayed area and its size (zoom).

During an automatic adjustment stage, an exemplary OAD 258 can be adapted to get from OADC 242 instructions related to the TPVS which participates in the session and the layout that is associated with a relevant output module 255. The instructions can include, but are not limited to, which decoded video streams to get and process for determining stitching instructions for a TPVS that is currently handled and the relative position of the streams (images) as well as the slot in the layout that is associated with the stitched image. After getting the instructions, OAD 258 can initiate a process for searching overlay areas and scaling factors. At the end of the process, a stitching instruction file can be delivered to OADC 242. At this stage OAD 258 is ready to start an automatic adjustment process for a next TPVS and/or a next output module, which can be associated with another layout or another conference. In an alternate exemplary embodiment of video module 250, a plurality of OAD 258 can be used, each associated with an output module.

For searching overlay areas and scaling factors, OAD 258 can get the relevant images from the video common interface 254. Each image can be stored in a single frame memory. The frame memories can be organized along a virtual line of images according to the position of the images, from left to right, for example. In a situation that the video zone of the relevant TPVS includes a matrix of video cameras, the frame memories can be organized in a virtual matrix, from top left to bottom right, for example. After organizing the frame memories, OAD 258 can scan areas close to the edge of each frame memory, which can be used as a border with an adjacent frame memory, looking for overlay areas that are repeated in both images; in the right edge of the first image and in the left edge of the second image, for example. Alternatively and/or additionally two pairs of similar repeated points, one pair in each adjacent image, can be searched. Based on these two pairs, a scale factor can be defined. An offset value for shifting (left/right; up/down) one of the images can be defined also. An embodiment can use the left frame memory (left image) as a reference, for example.

After processing the images of the relevant TPVS, information on the stitching border between any two adjacent images is organized in a stitching instruction file. The information can include cropping, scaling and offset information for each one of the images. The stitching instruction file can be transferred to OADC 242.

Different methods can be used by OAD 258 for executing the adjustment stage. Some exemplary automatic process can use alignment indicators. Exemplary alignment indicators can be embedded within the decoration of the TPVS room over the conferencing table or over the wall behind the chairs, for example. Other embodiments may use a projector that can project the alignment indicators during the adjustment stage, etc. An exemplary projector can be a LED or laser pointer. Another exemplary automatic process can analyze the images looking for similar areas. More information on OAD 258 is depicted below in conjunction with FIG. 3 and FIG. 5.

The architecture illustrated in FIG. 2 is a centralized architecture in which the VCU 200 includes the OADC 242 and an OAD 258. Alternatively, a decentralized or distributed architecture can be used. In a decentralized architecture, the OAD 258 can be located at each TPVS and only the OADC 242 can be included in the VCU, for example. In such embodiments, the adjustment stage can be executed at the site of the TPVS after installation, for example. The outcome of the calibration stage, the stitching instruction file, can be stored in a configuration file of the TPVS. During establishing of the videoconferencing session, the stored stitching instruction file can be transferred to OADC 242 via NI 220. OADC 242 can be adapted to process the stitching instruction file and deliver editing instructions to the relevant one or more editors 256.

A reader wishing to learn more about a video module in an MCU is invited to read U.S. patent application Ser. No. 10/144,561 and U.S. Pat. No. 6,300,973, the entire contents of which are incorporated herein by reference.

Figure 3:
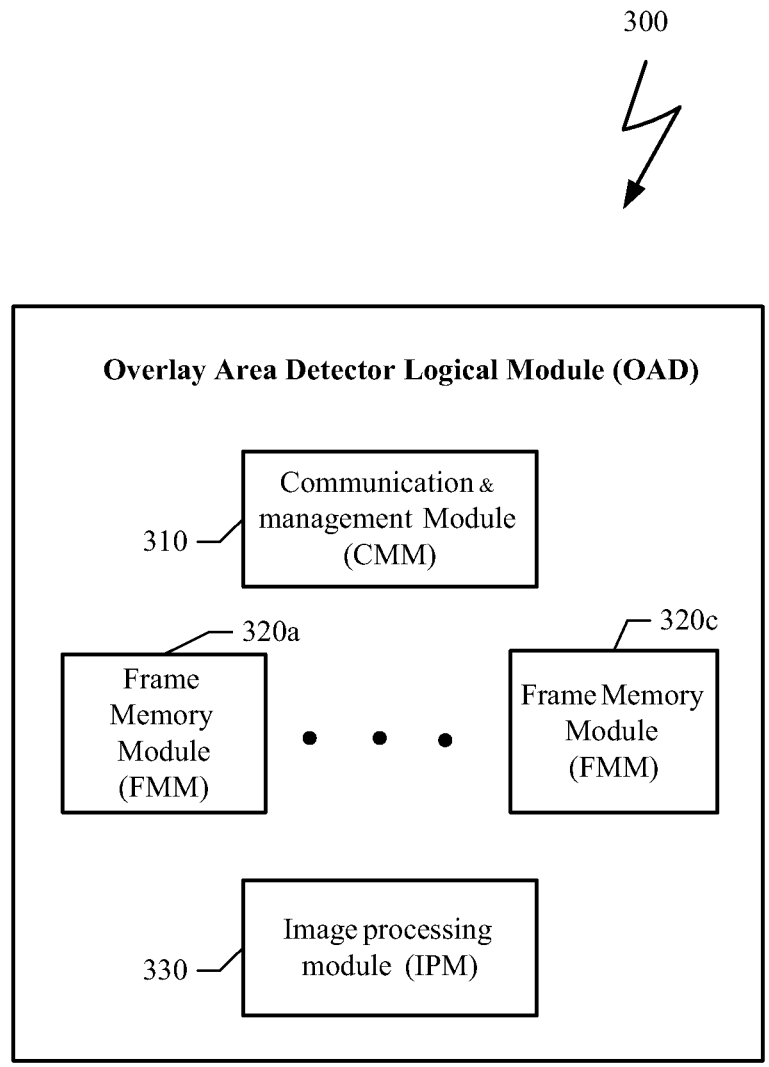
FIG. 3 is a simplified block diagram with elements of an exemplary overlay area detector module (OAD) that implements exemplary techniques, which are disclosed below.

FIG. 3 is a block diagram illustrating an exemplary Overlay Areas Detector (OAD) logical module 300. OAD 300 can be used in exemplary embodiments in which the adjustment stage is automatic. An exemplary OAD 300 can be capable of analyzing two or more video streams received from a TPVS 140 (FIG. 1) via NI 220 (FIG. 2) and decoded by two or more input modules 251 (FIG. 2). OAD 300 can be capable of identifying one or more overlay areas in adjacent images. The overlay areas can be further processed for identifying two pairs of similar repeated image elements in each overlay area. Such elements can actually be an area within the image containing a shape like a crucifix, two crossing line or a corner of an element, for example. The coordinates (in pixels from top left of each image, for example) of each point in the two pairs can be used for calculating a scale factor and an offset (shift) between the two adjacent images.

An exemplary OAD 300 can include a communication & management module (CMM) 310, a bank of two or more frame memory modules (FMM) 320*a-c*, and an image processing module (IPM) 330. The number of allocated FMM 320*a-c* can vary from one adjustment stage to another, depending on the TPVS 140 (FIG. 1) that is currently being adjusted. A matrix of FMM 320*a*1-*cm* can be used if the current TPVS has a matrix of video cameras. The number of frame memories can match the number of streams (video cameras) sent from the TPVS. If a matrix of video cameras is used by a current TPVS, OAD 300 can repeat its process per each line of video cameras, which is reflected by a line of FMMs 320*a*1-*am* (not shown in the drawing). A process for identifying overlay areas between vertical adjacent images can be similar to identifying overlay areas between horizontal images. For vertical images searching can be done up and down relative to the horizontal edges of the images.

CMM 310 can be used for communicating with OADC 242 (FIG. 2) and for managing the operation of OAD 300. CMM 310 may receive commands and information from OADC 242. Exemplary commands can include: get parameters, start the adjustment stage, etc. The information can be related to the TPVS that is currently adjusted and can include: the number of video cameras, how to collect the decoded video stream of each camera from the common interface 254 and information on the relative placement of the video streams to match the positioning of the cameras in the video zone of the TPVS, etc. The information for collecting the video streams can depend on the type of the common interface 254. For a TDM bus, the information can be a time slot per each stream. For a shared memory, it can be an address interval in which the video stream is stored, etc. CMM 310 can deliver a stitching instruction file, which is the result of the image processing made by IPM 330, and status information.

In an embodiment in which OAD 300 is embedded within a VCU 200 (FIG. 2), CMM 310 can communicate with the OADC 242 via the internal control bus. In an embodiment, in which OAD 300 is associated with a TPVS, the communication between CMM 310 and OADC 242 can be via network 110 (FIG. 1) and NI 220 (FIG. 2). The communication can be based on Internet Protocol (IP), for example.

Upon receiving the information regarding the current TPVS, CMM 310 can allocate a number of FMMs 320 according to the number and the setup (a line or a matrix) of the video cameras in the video zone of the current TPVS. Each FMM 320 can include a read/write controller and a frame memory. A frame memory is a memory that stores video data associated with a video frame from a camera. Each address of a frame memory is associated with a pixel or a group of pixels on the screen. The read/write controller of each FMM 320 can get the relevant decoded video from the common interface 254 (FIG. 2) and store it in the appropriate addresses. While processing the image, the read/write controller can get the requested pixel's data and deliver it to IPM 330.

In an exemplary embodiment that uses colored alignment indicators, an IPM 330 may filter around the values of each component, YUV, of the decoded video of the alignment indicator. The values of YUV of the filter can be delivered from the TPVS during establishing the session, for example. Alternatively, the YUV values of the filters can be defined as standard parameters. IPM 330 can copy a right vertical strip from the left image converting each pixel in the strip to true if the value fits the filter and false if the value is out of the filter. The strip can include 25%; 12.5%; etc. of the frame of the left image. The filtered portion of the image (the filtered strip) can be parsed and the area in which the value is true can be compared to the expected shape of the alignment indicator. If it matches, the coordinates in pixels of the center of the each aliment indictor of the left image are stored as the first set of coordinates in the stitching instruction file.

After processing the top left image IPM 330 may start processing the image that is adjacent on the right side of the first image. The process can be similar to the above, however this time the analyzed strip is the left strip of the second image. After determining the coordinates of the alignment indictors in the left area of the second image, IPM 330 may proceed to the right side of the second image, and so on and so forth.

In an embodiment in which the alignment indicators are projected, during the adjustment process, OADC 242 can instruct the relevant TPVS to turn on the projectors and keep it on until the end of the adjustment process. Searching for the projected alignment indicators can be similar to the process of searching the alignment indicators that are embedded within the decoration.

Yet in another exemplary embodiment of OAD 300 in which alignment indicators are not used, IPM can use a correlation algorithm for processing two adjacent images searching for overlay areas.

Figure 4:
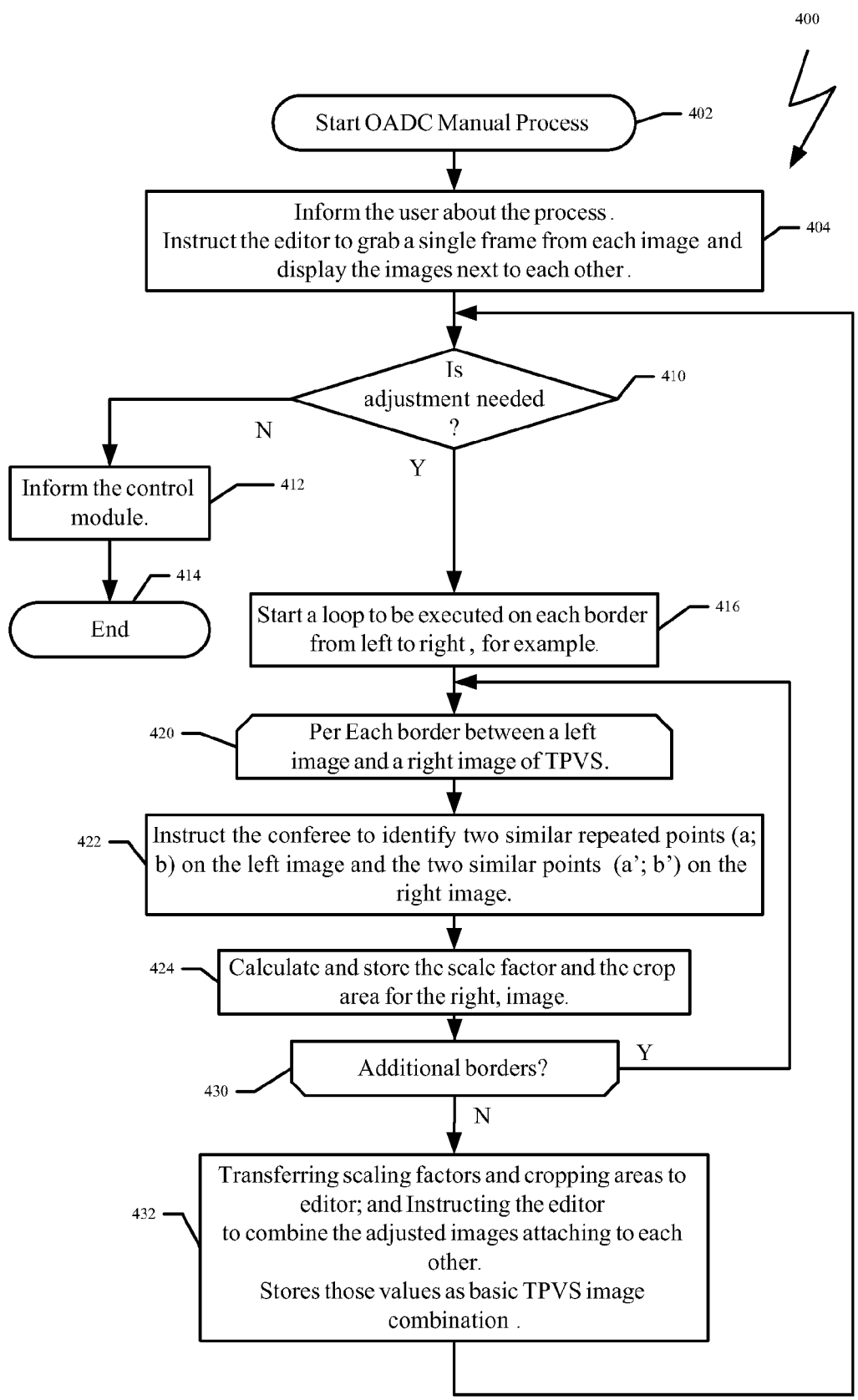
FIG. 4 is a flowchart illustrating steps of an exemplary method for manual detecting of overlay area.

FIG. 4 is a flow diagram illustrating an exemplary manual method 400 detecting overlay and adjusting the images accordingly. Method 400 can be executed by an exemplary Overlay Areas Detector Controller OADC 242 (FIG. 2). Method 400 can be implemented when the detection and correction of the overlaying areas is performed manually by a user. An Exemplary method 400 may be initiated 402 by Control module 240 (FIG. 2) upon establishing a conference call, in which at least one site is using a TPVS 140 (FIG. 1) and at least one other site is using a regular endpoint 130, such that combining the two or more video streams of the TPVS 140 to one video stream is required. During initiation 402, OADC 242 can be introduced to the different video modules 250 (FIG. 2) such as input modules 251 and output modules 255 and the common interface 254. Different resources that are needed for the operation of OADC 242 can be allocated and initiated. Such resources include those needed for the click and view functionality such as DTMF filters in the audio module 230, for example.

After initiation, the user of the regular endpoint is informed 404 that an overlay area manual detection process has started. The user can be informed by a text message on his video screen or by an IVR audio stream or both, for example. Other conferees can also be informed that an overlay area manual detection process has started. The user can then be informed that he will be presented with two or more images, each image from a different TPVS video camera. The user will also be instructed\requested to point out a pair of points: (a:b) on the left image and a similar repeated pair (a':b') on the right image—the similar points that are repeated in the images.

At the end of step 404 the editor 256 (FIG. 2) is instructed to get a single frame from each image of the two or more TPVS video cameras, and display the different frames next to each other on the users screen. User's search for similar repeated points can be performed on one single frame of each image.

Next, the user is asked 410 (via click and view menu or IVR or both, for example) if adjustment is needed. A positive response indicates that overlay areas exist. There is a possibility that there are no overlay areas, therefore no adjustments are needed. For example, where the cameras in the TPVS room were calibrated and adjusted such that no overlay areas should exist. Another case where no adjustment will be needed is if the TPVS has a basic stitching instruction file already set and it is sent through the network 110 (FIG. 1) to the control module 240 (FIG. 2) via NI 220. If 410 no adjustments are needed, the Control module 240 is informed 412 and the process ends 414. If 410 adjustments are needed, a loop between step 420 and 430 is initiated.

The overlay areas are expected to be only near the borders of the images. Therefore a loop is executed 416, from left to right, on each border of the images from the TPVS. For example, if the TPVS has only two video cameras (images) then the borders that will be searched for overlay is the right border of the left image and the left border of the right image. If there are three video streams (images) from TPVS than the borders that will be searched are: the right border of the left image with the left border of the middle image, and the right border of the middle image with the left border of the right image, and so on.

The loop begins at step 420, per each border between a left image and a right image of TPVS. The user responsible for the manual detection of the overlaying areas is instructed 422 to select a pair of repeated points: (a:b) on the left image and a similar pair (a':b') on the right image. The user can select outstanding points such as the meeting point of two crossing lines or a corner of an element, for example. Other points can be alignment indicators placed on the table or wall, for example. The alignment indicators can also be projected markers that can be turned on in the TPVS room during the initiation phase. The projected markers can be lights of common pointers, which are associated with each TPVS camera, and can be remotely controlled. The user can point on the similar repeated points by moving a cursor (cross-hairs, for example) on the screen. The movement of the courser can be controlled by: a computer mouse, far end camera control (FECC) arrows, DTMF, click and view menu or a combination of all of the above, for example.

After receiving the coordinates of the points, in pixels, for example, method 400 can calculate and store 424 a scale factor, the coordinates of the overlay area and an offset factor, in one or both images. More information on the calculation procedure will be given in following sections. After the calculation, the right image is scaled according to the left image and the overlay area is cropped from the right image. In another embodiment, the right image can be the reference image and the left image can be the one scaled and cropped. In another embodiment, a portion of the overlay area can be cropped from the left image and the rest of the overlay area is cropped from the right image, and both images are rescaled.

Next, a decision is made 430 whether an additional border exists. In this exemplary embodiment the search is from left to right, but it can be from right to left. In case of a matrix of images, the borders shared between the upper images and the lower images are also examined and adjusted. If 430 an additional border exists, then process 400 returns to step 420 and the loop is executed on the next border. If 430 an additional border does not exist, than process 400 proceeds to step 432.

The OADC 242 (FIG. 2) transfers 432 the scaling factors, the offset factors and the cropping areas to the editor 256. The OADC 242 can instruct the editor 256 how to combine and attach (stitch) the video images received from the TPVS to each other. The OADC 242 can store the calculated parameters as a basic TPVS stitching instruction file of the specific TPVS for future use. The stitching instruction file of the specific TPVS can be used later for the sliding window as well. Process 400 returns to step 410 to check if more adjustments are needed. The stitching instruction file of the specific TPVS can be stored in the MCU for future conferences with the same TPVS. Alternatively and/or additionally the stitching instruction file of the specific TPVS can be sent and stored at the specific TPVS.

In another exemplary embodiment, in which the VCU is embedded within the TPVS itself, or connected directly to the TPVS, an administrator of the TPVS may control the VCU during the operation of method 400. This exemplary embodiment enables the stitching of the two or more video streams (images) of TPVS into one video stream (image) without the need of a MCU. Such an exemplary embodiment can be used in point to point (P2P) videoconference between a TPVS and a regular endpoint. In such a case, two or more TPVS video streams are passed through the VCU to be stitched into one video stream to be sent to the regular endpoint. If the P2P videoconference is between two TPVSs then the video stream are passed directly between the TPVSs and not through the VCU.

Figure 5:
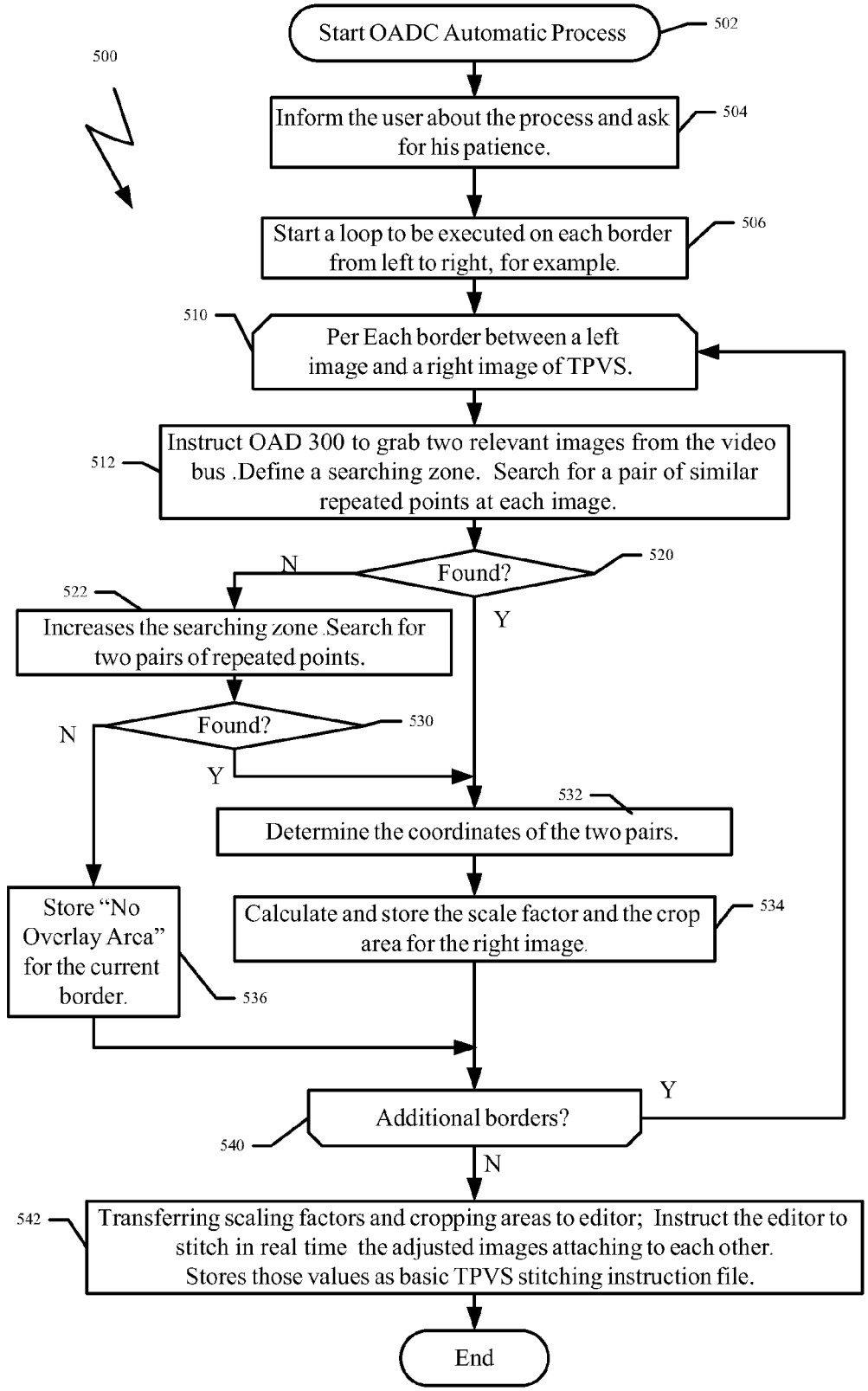
FIG. 5 is a flowchart illustrating steps of an exemplary method for automatic detection of overlay area.

FIG. 5 is a flow diagram illustrating an exemplary automated method 500 for detecting overlay and adjusting the images accordingly. Method 500 can be executed by an Overlay Areas Detector Controller (OADC) 242 (FIG. 2). Process 500 can be implemented automatically without the need of user assistance. An exemplary method 500 may be initiated 502 by control module 240 (FIG. 2) upon establishing a conference call, in which at least one site is using a TPVS 140 (FIG. 1) and at least one other site is using a regular endpoint 130 (FIG. 1), such that there is a need for combining the two or more video streams of the TPVS 140 to one video stream. During initiation 502 OADC 242 can be introduced to the different video modules 250 (FIG. 2) such as input modules 251, output modules 255 and the common interface 254. Resources needed for the operation of OADC 242 can be allocated and initiated; resources such as OAD 258, for example.

After initiation, conferees can be informed 504 that an automatic overlay area detection process has started. The conferees can be informed by text messages over their video screen, by an IVR audio message or both. Then, an external loop between step 510 and 540 is initiated. The loop is executed 506 on each border between images of the TPVS from left to right—since the overlay areas are expected to be only near the borders of the frames. In this exemplary embodiment the search is from left to right, but it can be from right to left. If the TPVS video images are arranged as a matrix, then the borders shared between the upper images and the lower images are also examined and adjusted as well.

Next the OAD 300 (FIG. 3) is instructed 512 to get two relevant images, meaning the image on the left of the border and the image on the right of the same border, from the common interface 254 (FIG. 2). For each of the two images a searching zone can be defined 512. The searching zone can be a strip next to the shared border. The size of the strip can be few percentages of the image size, 10%, 15%, 20% of each image, for example. The searching zone size can be adjusted and changed during the search for the similar repeated points. Next, OAD 258 begins its search 512 for the similar repeated points. Exemplary searching processes are disclosed above in conjunction with FIG. 3. The two similar repeated points can be an area within the image containing a shape like a crucifix, two crossing lines or a corner of an element, for example. In another embodiment, the two similar repeated points can be alignment indicators on the table or wall, for example. The alignment indicators can also be projected markers activated during the adjustment phase. The projected markers can be emitted from laser or LED devices associated with each TPVS camera, and can be remotely controlled, for example.

Then, a decision is made 520, whether a pair of points: (a:b) on the left image and a similar repeated pair (a':b') on the right image were found by OAD 258. If 520 not, then the searching zone size can be increased 522, and the OAD 258 can be instructed to search again. A decision is made 530 whether a pair of similar repeated points was found in the larger area. If 530 not, an indication of "No overlay Area" for the current border can be created and stored 536 and method 500 continues to step 540. In another embodiment, the search can continue by increasing again the search zone area repeatedly till a predefined search-zone size is reached. Yet in another embodiment, if no similar repeated points were found, a manual OADC process 400 can begin. Returning to step 530, if pairs of similar repeated points were found, than process 500 proceeds to step 532.

Returning to step 520, if at least two similar repeated points are found, then process 500 proceeds to step 532. In step 532 the coordinates of the two similar repeated points are determined 532. Next, the scale factor is calculated and stored 534 and the image on the right of the border is cropped accordingly. In another embodiment, the image on the left of the border is cropped and the image on the right is left as is. An exemplary technique for calculating the scale factor can include calculating the distance between the two points of each pair along the two axes (DeltaX1 & DeltaY1) for the first image and (DeltaX2 & DeltaY2) for the second image. Then, the value of the scaling factor in the horizontal axis is calculated by dividing DeltaX1 by DeltaX2. Similarly, the value of the scaling factor in the vertical axis is calculated by dividing DeltaY1 by DeltaY2. An exemplary technique for calculating the area to be cropped can include calculating the distance D1 of one of the similar repeated points in the left image to the right edge of the image, next calculating the distance D2 of the same similar repeated point in the right image to the left edge of the image. The size of the overlay area to be cropped on the right image is a strip at a thickness of D1+D2 from the left edge of the right image. The calculation of the cropped area takes into account the scale factor which was calculated previously. A similar calculating technique can be applied for cropping the repeated area from the left image or cropping a portion of the repeated area from the left image and another portion from the right image.

In another exemplary embodiment, step 534 can further comprise height adjustment of the two images. A shift in the height between a first repeated point in the left image and the similar first repeated point in the right image can be calculated, taking into account the scaling factor. The result can be stored as a shift factor in the stitching instructions file. Yet in another exemplary embodiment, step 534 can further comprise rotation adjustment of the two images. For each image the angle between the imaginary line connecting the two repeated points and the image X axis is calculated. The difference between the two angles can be stored as a rotation factor in the stitching instructions file.

After the calculation, a decision whether there are additional borders is made 540. If yes, than process 500 returns to step 510. If 540 there are no additional borders, then process 500 proceeds to step 542. At step 542 the calculated scale factor and crop area are sent to the editor 256. The editor is instructed 542 to scale, crop and combine (stitch) the adjacent images. The editor executes those instructions during the conference session per each video frame (in the video frame rate) while building a next frame to be encoded and transmitted to the user. The calculated scale factor and crop area can be stored as basic TPVS stitching instruction file of the specific TPVS. And process 500 ends.

In another embodiment, step 542 can further comprise handling the correction of the height shift and/or the rotation, if needed, based on the calculated factors as described in step 534.

Figure 6:
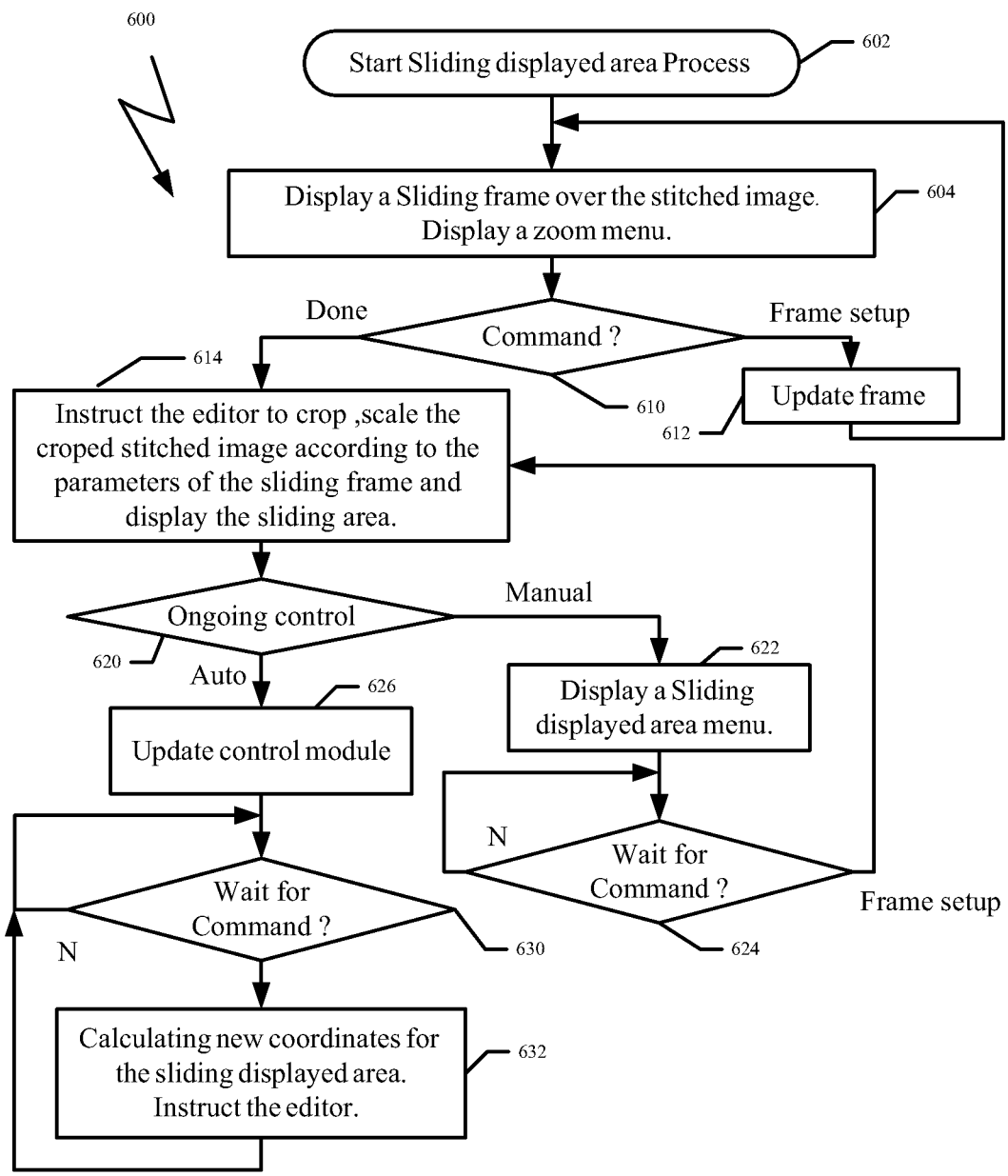
FIG. 6 is a flowchart illustrating steps of an exemplary method for controlling the location of the sliding displayed area over the stitched image.

FIG. 6 is a flow diagram illustrating an exemplary method 600 for zooming in/out and sliding a displayed area. Method 600 can be executed by the OADC 242 and editor 256 (FIG. 2). Exemplary method 600 may be initiated 602 by a user wishing to zoom in/out a certain area in the stitched image. The user can initiate 602 the zoom and slide process 600 by using the click and view menu, for example. In another embodiment, the user can initiate the process 600 by DTMF, by IVR or any combination thereof. After initiation, a sliding frame over the stitched image is displayed 604. The sliding frame can be in the proportion of the area related to the TPVS stitched video image on the displayed layout. A zoom menu can be displayed 604. The zoom menu can be one of the manus that are implemented by a click and view function, for example. The zoom menu can include frame setup commands for increasing, decreasing and sliding the frame across the stitched image, for example.

Next, a decision is made 610 whether a command has been received from a user. If 610 yes and the command is a frame setup command, then the frame is updated 612 accordingly and method 600 returns to step 604. If 610 the command received is 'Done-command', then the editor 256 is instructed 614 to crop the image according to the area defined by the sliding frame. The cropped stitched image is then scaled 614 according to the slot size in the layout. The editor 256 performs the cropping, scaling and placement of the sliding frame at the video rate per each frame received from the TPVS.

Next, a decision is made 620 as to which ongoing control method the user prefers for controlling the movement of the sliding frame. In this exemplary embodiment, there are two control methods: auto or manual. The manual control can be implemented by a user that slides the stitched image in the displayed area using a cursor or arrows of the far end camera control, for example. The auto control can be implemented by automatically moving the center of the sliding frame to the area in the stitched image having the highest energy (voice activity level) among all the audio received from the TPVS, for example.

If at step 620 manual control is chosen, then a sliding control menu is displayed 622 on the user's monitor (screen), for example. The sliding control menu can have different options such as: move up, move left, and so on. Then process 600 waits 624 for a user command. If 624 a command from user is received, the command is executed and process 600 returns to step 614. Executing the command can be implemented by calculating the location of the newly selected displayed area within the stitched image and instructing the editor 256 (FIG. 2) to build the next frame to be encoded accordingly.

Returning now to step 620, if auto control is chosen, then the control module 240 (FIG. 2) is updated 626 accordingly. Method 600 waits 630 for a command from the control module. The command specifies positioning of the sliding displayed area can be based on the audio energy of the different sources in the TPVS room, for example. In step 632, OADC 242 calculates the coordinates of the highest audio energy source within the entire stitched image. Then, OADC 242 calculates the new coordinates for the sliding frame and instructs the editor 256 to display the new area accordingly. Then, method 600 returns to step 630 waiting for the next automatic command.

Another exemplary automatic method can be based on detection of a change in the lip movement of a speaker in the area that the sliding frame is present versus lip movement of another speaker in a different area in the entire stitched image, and positioning the displayed area accordingly.

In the description and claims of the present application, each of the verbs, "comprise" "include" and "have", and conjugates thereof, are used to indicate that the object or objects of the verb are not necessarily a complete listing of members, components, elements, or parts of the subject or subjects of the verb.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware. Software of a logical module can be embodied on a computer readable medium such as but not limited to: a read/write hard disc, CDROM, flash memory, ROM, etc. In order to execute a certain task a software program can be downloaded to an appropriate processor as needed.

Various aspects and embodiments of the invention have been described are provided by way of example and are not intended to limit the scope of the invention. The described embodiments comprise different features, not all of which are required in all embodiments. Some embodiments utilize only some of the features or possible combinations of the features. Variations of embodiments described and embodiments comprising different combinations of features noted in the described embodiments will occur to persons of the art.

I claim:

1. A method of forming a panoramic video image from video images received from two or more video cameras located at a single videoconferencing site, comprising:
receiving two or more video streams generated by the two or more video cameras;
removing an overlay area in the video image data from at least one of the video streams;
stitching the remaining video image data of the two or more video streams in real time to form a stream of panoramic video image data representative of the two or more video streams.

2. The method of claim 1, further comprising decoding the two or more video streams to yield video image data for each of the video streams.

3. The method of claim 1, further comprising:
encoding the stream of panoramic video image data; and
sending the encoded stream of panoramic video image data toward a videoconferencing entity.

4. The method of claim 3, wherein the video conferencing entity is a regular endpoint.

5. The method of claim 1, wherein the overlay area is calculated based on similar image elements repeated in at least two of the video image data from the two or more video streams.

6. The method of claim 5, wherein the repeated similar image elements are identified manually by a user.

7. The method of claim 5, wherein the repeated similar image elements are identified automatically.

8. The method of claim 7, wherein the overlay area is calculated from a snapshot video image from each one of the two or more video streams.

9. The method of claim 5, wherein the repeated similar image elements are alignment indicators projected in a field of view of the two or more cameras at the single conferencing site.

10. The method of claim 1, further comprising scaling the video image data of at least one of the video streams.

11. The method of claim 1, further comprising height adjusting the video image data for at least two of the video streams.

12. The method of claim 1, further comprising rotation adjustment of the video image data for at least two of the video streams.

13. The method of claim 1, further comprising creating a stitching instruction file comprising data about the overlay area.

14. The method of claim 1, wherein removing the overlay area, further comprises loading a saved stitching instruction file comprising data about the overlay area.

15. The method of claim 5, wherein removing the overlay area comprises calculating and storing a scale factor.

16. The method of claim 5, wherein removing the overlay area comprises calculating and storing a rotation factor.

17. The method of claim 1, further comprising providing a sliding display area for selecting a portion of the panoramic image to be displayed on a videoconferencing display.

18. The method of claim 17, wherein placement of the sliding display area on the panoramic image is controllable by a user.

19. The method of claim 18, wherein the placement of the sliding display area is controllable manually via a remote control.

20. The method of claim 17, wherein placement of the sliding display area is determined automatically.

21. The method of claim 20, wherein placement of the sliding display area is determined based on the audio energy of audio signals corresponding to the compressed video streams.

22. The method of claim 3, wherein the removing, stitching, and encoding are performed at a telepresence endpoint.

23. The method of claim 3, wherein the removing, stitching, and encoding are performed at an multipoint control unit (MCU).

24. A method for displaying two or more video images received from a telepresence videoconferencing system as a panoramic video image on a single videoconferencing display unit, comprising:
receiving at least two compressed video streams from the telepresence videoconferencing endpoint;
decoding the compressed video streams to yield video image data for each of the two or more video streams;
removing in real time an overlay area in the video image data from at least one of the decoded video streams; and
in real time, stitching the video image data of the remaining video streams of the two or more video streams to form panoramic video image data representative of the two or more video streams.

25. The method of claim 24, further comprising:
zooming a portion of the panoramic video image; and
displaying the zoomed portion of the panoramic video image on a videoconferencing display unit.

26. The method of claim 24, wherein the stitching comprises removing an overlay area in at least one of the two or more video images.

27. The method of claim 25, wherein the zoomed portion of the displayed panoramic video image is selected by a user of the videoconferencing display unit.

28. The method of claim 25, wherein the zoomed portion of the displayed panoramic video image is slid over the panoramic video image.

29. A video conferencing unit for forming a panoramic video image from compressed video streams from two or more cameras at a single videoconferencing terminal, comprising:
a video control unit adapted to:
decode the compressed video streams to yield video image data representative of video images for each of the video streams;
remove an overlay area in the video image data from at least one of the video images;
stitch the video image data of the remaining video images to form panoramic image data representative of the two or more video images,
encode the panoramic image data; and
send the encoded panoramic image data toward a videoconferencing terminal.

30. The video conferencing unit of claim 29, wherein the overlay area is calculated based on repeated similar image elements occurring in at least two of the video images.

31. The video conferencing unit of claim 30, wherein the repeated similar image elements are identified manually by a user.

32. The video conferencing unit of claim 30, wherein the repeated similar image elements are identified automatically.

33. The video conferencing unit of claim 30, wherein the repeated similar image elements are alignment indicators projected in a field of view of the two or more cameras.

34. The video conferencing unit of claim 29, further adapted to scale at least one of the video images.

35. The video conferencing unit of claim 29, further adapted to align at least two of the video images.

36. The video conferencing unit of claim 30, further adapted to create a stitching instruction file comprising data about the overlay area.

37. The video conferencing unit of claim 30, further adapted to calculate and store a scale factor for at least one of the video images.

38. The video conferencing unit of claim 29, further adapted to provide a sliding display area for selecting a portion of the panoramic image to be displayed on the videoconferencing display.

39. The video conferencing unit of claim 38, wherein placement of the sliding display area on the panoramic image is controllable by a user.

40. The video conferencing unit of claim 39, wherein the placement of the sliding display area is controllable manually via a remote control.

41. The video conferencing unit of claim 38, wherein placement of the sliding display area is determined automatically.

42. The video conferencing unit of claim 41, wherein placement of the sliding display area is determined based on the audio energy of audio signals corresponding to the compressed video streams.

\* \* \* \* \*